United States Patent

[11] 3,562,636

[72] Inventor John C. Huber
 Bear Lake, Minn.
[21] Appl. No. 826,133
[22] Filed May 20, 1969
[45] Patented Feb. 9, 1971
[73] Assignee Minnesota Mining and Manufacturing Company
 St. Paul, Minn.
 a corporation of Delaware

[54] BRIDGE CIRCUIT HAVING PLURAL COMPENSATING ARMS
 11 Claims, 11 Drawing Figs.
[52] U.S. Cl. ................................................. 324/34
[51] Int. Cl. ............................................... G01r 33/00
[50] Field of Search ............................. 324/34, 43, 40

[56] References Cited
 UNITED STATES PATENTS
2,980,848 4/1961 Datt et al. ................... 324/34
3,500,180 3/1970 Mogilevsky ................. 324/34

Primary Examiner—Alfred E. Smith
Attorney—Kinney, Alexander, Sell, Steldt and Delahunt ABSTRACT: An AC bridge circuit which provides a means for compensating for both in and out of phase components of a fundamental frequency, as well as for harmonics of the fundamental frequency, is disclosed. The bridge utilizes a number of parallel branches (arm pairs) in a compensating leg, each branch having different impedance-versus-frequency characteristics thereby providing for separately compensating for a disparate component or harmonic. Applicable to systems for detection and measurement of a wide variety of electrical, magnetic and optical properties, the circuit is especially useful in conjunction with measurement of very weak magnetic materials, wherein the harmonics resulting from the primary excitation field are of comparable or greater magnitude than the signal generated as a result of exciting the magnetic material. The bridge circuit is shown in a system for displaying hysteresis loops of weakly magnetic materials.

PATENTED FEB 9 1971

INVENTOR.
JOHN C. HUBER
BY Kinney, Alexander,
Sell, Steldt & De La Hunt
ATTORNEYS

PATENTED FEB 9 1971

INVENTOR.
JOHN C. HUBER
BY Kinney, Alexander
Sell, Steldt & DeLaHunt
ATTORNEYS 3,562,636

BRIDGE CIRCUIT HAVING PLURAL COMPENSATING ARMS

BACKGROUND OF THE INVENTION

This invention relates generally to a bridge circuit for measuring electrical signals representative of properties of materials and specifically to a bridge circuit for measuring magnetic properties of weakly magnetic materials.

A typical prior art bridge circuit useful for measuring magnetic properties of materials is described in U.S. Pat. 2,434,203 to Farrow. In the Farrow bridge circuit a sample of the material under measurement is placed within a search coil of a sample arm. An electrical signal representative of a property of the sample material is produced by exciting the material sample with energy of a predetermined fundamental frequency. The sample arm is connected in series with a matching arm having electrical properties approximately equivalent to those of the sample arm. A compensation matrix comprising compensation arms connected to each other at a sensing terminal and having adjustable resistive and adjustable capacitive elements is connected across the series connected sample arm and matching arm. Prior to introduction of the material sample, the resistive and capacitive elements are adjusted to compensate for signals induced in the search coils of the sample arm and the matching arm in order to produce a null across the bridge between the sensing terminal and a common terminal at the junction of the matching arm and the sample arm. Thus, when a material sample is thereafter placed in the sample arm search coil the signal produced across the bridge and detected at the sensing terminal is representative of the magnetic properties of the sample material.

However, these typical prior art bridge circuits, such as the Farrow bridge circuit, are generally insensitive to signals provided in response to the magnetic properties of weakly magnetic materials, such as ferrimagnetic and paramagnetic materials. This lack of sensitivity is largely due to the fact that the magnitude of such weakly magnetic signals is comparable to the magnitude of those multiple harmonic frequency components of signals present in the bridge circuit incident to the energy which excites the material sample.

In a typical prior art system, these multiple harmonic frequency components are compensated for by separately generated multiple harmonic signals which are inserted into the circuit in opposition to these multiple frequency components. This system is described in "Magnetization Hysteresis Loop Tracer for Long Specimens of Extremely Small Cross Section" by Crittenden et al., The Review of Scientific Instruments, Volume 22, Page 872, (1951). The Crittenden et al. system requires an additional signal generation source for each harmonic frequency for which compensation is required. Another system for compensating for these multiple harmonic frequency components provides for using auxiliary search coils to provide compensating signals proportional to the first and second derivatives of the energy excitation field, which coils are adjustable in magnitude and phase. See "Sensitive Flux Measurement of Thin Magnetic Films" by Oguey, The Review of the Scientific Instruments, Volume 31, Page 701, (1960).

SUMMARY OF THE INVENTION

The present invention provides a compensation arm matrix for enabling the bridge circuit for detection of weak representative signals of a magnitude comparable to the magnitude of those multiple harmonic frequency components present in the bridge circuit incident to the energy which excites the material sample.

The compensation arm matrix includes parallel connected pairs of approximately equivalent compensation arms for substantially separately compensating for the in-phase predetermined fundamental frequency component (which component is in phase with the excitation energy), for the out-of-phase predetermined fundamental frequency component, and for each multiple harmonic frequency component of a magnitude comparable to the magnitude of the representative signal. All of the arms are connected to each other at the sensing terminal of the bridge circuit. The first pair of approximately equivalent compensation arms is for compensating for the in-phase predetermined fundamental frequency component and comprises resistive elements including a resistance dividing device having a divider connected to the sensing terminal of the bridge circuit for adjusting the resistance in each arm of the pair. Connected in parallel with the first pair of approximately equivalent compensation arms is a second pair of approximately equivalent compensation arms for compensating for the out-of-phase predetermined fundamental frequency component and comprises impedance elements including an impedance dividing device having a divider connected to the sensing terminal for adjusting the impedance in each arm of the pair. At least one additional pair of approximately equivalent compensation arms is added in parallel with the first and second pairs for compensating for those multiple harmonic frequency components present in the bridge circuit incident to the excitation of the material sample and which are of a magnitude comparable to the representative signal provided at the sensing terminal. Each of the additional pairs of compensation arms also comprises impedance elements including an impedance dividing device having a divider connected to the sensing terminal for adjusting the impedance in each arm of the pair.

The impedance elements of the second pair of approximately equivalent compensation arms are selected so that the second pair has an impedance-versus-frequency characteristic whereby the greatest phase angle sensitivity to changes in impedance is at approximately the predetermined fundamental frequency.

The impedance elements of each of the additional pairs of approximately equivalent compensation arms are selected so that each pair has an impedance-versus-frequency characteristic whereby the greatest sensitivity to changes in impedance is at approximately the frequency of the component for which that pair is adjusted.

In furtherance of the present invention, at selected frequencies the given impedance values of each pair of approximately equivalent compensation arms is selected to be disparate given impedance values whereby substantially separate compensation adjustments can be made for the in-phase predetermined fundamental frequency component, for the out-of-phase predetermined fundamental frequency component, and for those multiple harmonic frequency components having a magnitude comparable to the magnitude of the representative signal notwithstanding a state of imbalance in certain of the pairs of approximately equivalent compensation arms as to components of the selected frequencies.

The first pair of approximately equivalent compensation arms has a given resistance. At the predetermined fundamental frequency this resistance is substantially less than the given impedance value of the other pairs of approximately equivalent compensation arms, so that the resistance divider of the first pair may be adjusted to substantially compensate for the in-phase predetermined fundamental frequency component notwithstanding an imbalanced state in the other pairs as to the predetermined fundamental frequency component. Likewise, at the predetermined fundamental frequency the given impedance value of the second pair is substantially less than the impedance value of the additional pairs of approximately equivalent compensation arms so that the impedance divider of the second pair may be adjusted to substantially compensate for the out-of-phase predetermined fundamental frequency component notwithstanding a state of imbalance in the additional pairs as to the predetermined fundamental frequency component. The given impedance value of each additional pair of approximately equivalent compensation arms is similarly selected to be substantially less at the frequency of the component for which it is designed to compensate than the impedance value of any parallel connected additional pairs of approximately equivalent compensation arms which are designed for compensating for higher multiple harmonic frequency components.

DESCRIPTION OF THE PREFERRED EMBODIMENT

Figure 1:
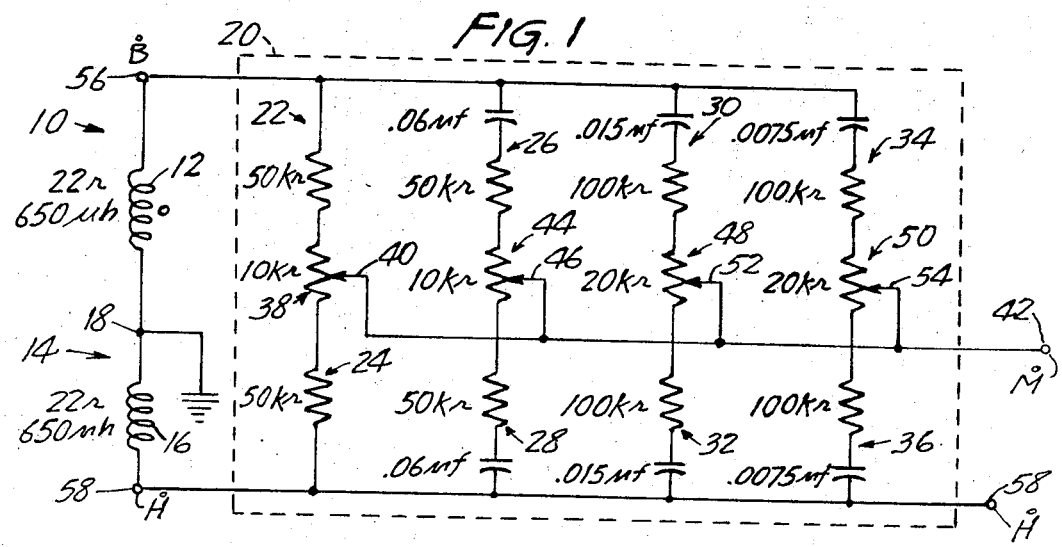
FIG. 1 is a schematic diagram of the bridge circuit of the present invention.

The preferred embodiment of the present invention as illustrated in FIG. 1, is a bridge circuit for measuring the magnetic properties of weakly magnetic materials. The sample arm 10 includes a search coil 12 in which a sample of the material under measurement is inserted. The energy which excites the sample material is provided by an alternating magnetic field. A matching arm 14 containing a search coil 16 is connected in series to the sample arm 10 at a grounded common terminal 18. The search coil 16 has electrical characteristics approximately equivalent to those of the search coil 12. Connected in parallel with the series connected sample arm 10 and matching arm 14 is a compensation arm matrix 20. The compensation arm matrix 20 includes a first pair of approximately equivalent compensation arms 22 and 24, a second pair of approximately equivalent compensation arms 26 and 28, and additional pairs of approximately equivalent compensation arms 30 and 32, and 34 and 36.

The first pair 22 and 24 contains resistive elements and is for compensating for the in-phase fundamental frequency component. The resistance dividing device 38 is a resistive voltage divider having a divider 40 which is adjusted for adjusting the resistance of the arms 22 and 24. The divider 40 is connected to the bridge circuit sensing terminal 42.

The second pair 26 and 28 contains both resistive and capacitive elements and is for compensating for the out-of-phase fundamental frequency component. The impedance dividing device 44 is a resistive voltage divider having a divider 46 which is adjusted for adjusting the impedance of the arms 26 and 28. The divider 44 is connected to the bridge circuit sensing terminal 42.

The additional arm pairs 30 and 32, and 34 and 36 also contain resistive and capacitive elements and are for compensating for the second harmonic frequency component and third harmonic frequency component respectively. The impedance dividing devices 48 and 50 are resistive voltage dividers having dividers 52 and 54 which are separately adjusted for adjusting the impedances in the arms of each pair. The dividers 52 and 54 are both connected to the bridge circuit sensing terminal 42.

The given component values shown in the circuit diagram of FIG. 1 are selected for a bridge circuit designed to provide for compensation of signals present in the bridge circuit incident to a magnetic field having a predetermined fundamental frequency of 60 Hertz. That is, the impedance-versus-frequency characteristics of the arm pairs 26 and 28, 30 and 32, and 34 and 36 are such that these arm pairs have their greatest sensitivity to changes in impedance at frequencies of 60, 120, and 180 Hertz respectively. At 60 HHertz, the given impedance value of the pair 22 and 24 is substantially less than the given impedance value of the pair 26 and 28, which is substantially less than the given impedance value of the pairs 30 and 32, and 34 and 36. At 120 Hertz, the given impedance value of the pair 30 and 32 is substantially less than the given impedance value of the pair 34 and 36. In accordance with these selected values, the resistance in each arm of the first pair of approximately equivalent compensation arms 22 and 24 can be adjusted by adjusting the position of the divider 40 of the resistive voltage divider 38 to substantially compensate for the in-phase fundamental frequency component notwithstanding a state of imbalance in the other pairs of approximately equivalent compensation arms 26 and 28, 30 and 32, and 34 and 36. Likewise, the impedance in each of the second pair 26 and 28 and the additional pair 30 and 32 can be separately adjusted by adjusting the position of the dividers 46 and 52 respectively to separately substantially compensate for the out-of-phase 60 Hertz component and the 120 Hertz component respectively, notwithstanding a state of imbalance in the higher harmonic compensation arm pairs 30 and 32, and 34 and 36; and 34 and 36 respectively.

The bridge circuit is balanced when a null is detected between the sensing terminal 42 and the common terminal 18. After the bridge circuit is balanced a material sample is inserted in the search coil 12 of the sample arm 10 and an electrical signal representative of the magnetic property of the sample material is detected at sensing terminal 42.

With no material sample in the search coil 12 of the sample arm 10, the flux density B of the internal field of the search coil 12 is equal to the external magnetic field strength H of a magnetic field providing a voltage drop across the search coils 12 and 16. A voltage signal representative of the first derivative of the flux density, B. may be detected from the terminal 56 at which the sample arm 10 is connected to the compensation arm matrix 20 and a voltage signal representative of the first derivative of the field intensity, H. may be detected from the terminal 58 at which the matching arm 14 is connected to the compensation arm matrix 20. When a material sample is present in the search coil 12, however, the flux density B of the internal field of the search coil 12 is equal to the sum of the external magnetic field strength H and the magnetization M of the specimen material times $4\pi$.

$B = H + 4\pi M$ (RMKS units).

Thus, when after first balancing the bridge circuit, a material sample is inserted in the search coil 12, a voltage signal representative of the first derivative of the sample material magnetization, M. may be detected from the sensing terminal 42.

Figure 2:
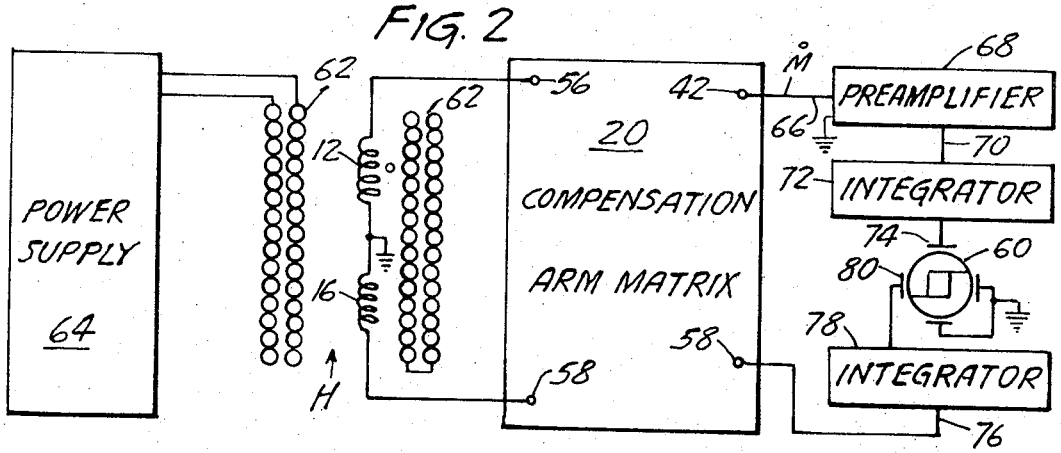
FIG. 2 is a schematic diagram, partially in block form, of the bridge circuit of FIG. 1 in a preferred application in which a cathode ray tube is used to display a signal representative of the magnetic properties of the sample material.

FIG. 2 is a schematic diagram, partially in block form, illustrating a preferred application of the bridge circuit of FIG. 1 for displaying on a cathode ray tube 60 of a cathode ray oscilloscope, a magnetization (M—H) curve of a sample material. The external magnetic field H is provided by a magnetizing coil 62 which is energized by a power supply 64. The signal from the sensing terminal 42 which is representative of the first derivative of the magnetization of the sample material, M, is led on line 66 through a preamplifier 68 and on line 70 through an integrator circuit 72 to a deflection means 74, for vertically deflecting an electron beam in the cathode ray tube 60. The signal from the terminal 58 which is representative of the first derivative of the external magnetic field strength, H, is led on line 76 through an integrator circuit 78 to a deflection means 80 for horizontally deflecting an electron beam on the face of the cathode ray tube 60.

Figure 3A:
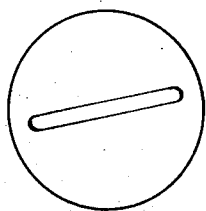
FIGS. 3A—3E are illustrations of waveforms observable in the face of a cathode ray tube of FIG. 2 during the procedure of balancing the bridge circuit of FIG. 1 prior to inserting a material sample for measurement.
Figure 3B:
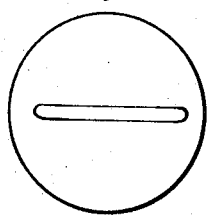
Figure 3C:
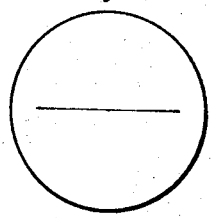
Figure 3D:
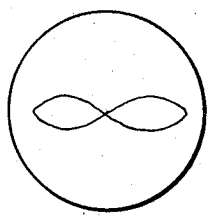
Figure 3E:
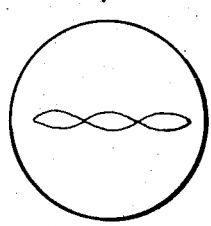

In measuring magnetic properties of sample materials, the bridge circuit is first balanced without a specimen in search coil 12 to provide a null between the sensing terminal 42 and the common terminal 18. When the bridge is out of balance as to the magnitude of the in-phase fundamental harmonic component, the lateral axis of the waveform displayed on the cathode ray tube 60 has a finite slope such as that illustrated in FIG. 3A. The voltage divider 38 of the first pair of compensation arms 22 and 24 is adjusted to produce a waveform such as that illustrated in FIG. 3B, which indicates that the magnitude of the in-phase fundamental harmonic component of the voltage drop between the sensing terminal 42 and the terminal 56 is substantially equal to the magnitude of the in-phase fundamental harmonic component of the voltage drop across the sample arm 10, and the magnitude of the in-phase fundamental harmonic component of the voltage drop between the sensing terminal 42 and the terminal 58 is approximately equal to the magnitude of the in-phase fundamental harmonic component of the voltage drop across the matching arm 14. The voltage divider 44 of the second pair of compensation arms 26 and 28 is then adjusted to provide a waveform on the cathode ray tube 60 substantially as illustrated in FIG. 3C which indicates the magnitude of the out-of-phase fundamental harmonic component of the voltage drop between the sensing terminal 42 and the terminal 56 is substantially equal to the magnitude of the out-of-phase harmonic component of the voltage drop across the sample arm 10 and that the magnitude of the out-of-phase fundamental harmonic component of the voltage drop between the sensing terminal 42 and the terminal 58 is substantially equal to the magnitude of the out-of-phase fundamental harmonic component of the voltage drop across the matching arm 14. The gain on the oscilloscope is then increased to the expected magnitude of the signal representative of the magnetic property of the sample material. If there is a second harmonic component present in the bridge circuit having a magnitude comparable to the expected magnitude of the representative signal, a waveform such as that illustrated in FIG. 3D is displayed on the cathode ray tube 60. The voltage divider 48 of the additional pair of compensation arms 30 and 32 is then adjusted to try to produce a waveform substantially as illustrated in FIG. 3C. If, however, at an oscilloscope gain level sufficient to display a signal representative of the magnetic property of the sample material, there appears on the cathode ray tube 60 a comparable third harmonic signal such as that illustrated in FIG. 3E, further adjustment of the additional pair of compensation arms 34 and 36 is then required. After the bridge circuit is balanced, the material sample is inserted in the center of search coil 12 by placing it on the end of a rod of nonmagnetic material, preferably glass. The signal which is then displayed on the cathode ray tube 60 is due only to the magnetic properties of the sample material. Depending upon the relative values of the elements used in the compensation arms, further adjustment in the previously adjusted arms may be necessary. Using the bridge circuit having the given component values shown in FIG. 1, a sensitivity of approximately 50 parts per million was obtained with about four or five series of adjustments. The sensitivity of 50 parts per million was determined by dividing the magnitude of the signal at the sensing terminal 42 by the magnitude of the signal at the terminal 58.

The magnetizing coil 62 used in the preferred embodiment is a one-half inch (about 1.2 cm) inside diameter by 7 inch (about 17.8 cm) long solenoid of 2 layers of 28 turns of three-sixteenths inch (about 0.5 cm) outside diameter copper tubing insulated with an epoxy such as that sold by Minnesota Mining and Manufacturing Company of St. Paul, Minnesota, under the trade designation "Scotchcast 8." Coil current is generated through 5 turns of the copper tubing which is wound on an autotransformer core. Cooling water is passed through the tubing. Currents of 300 amperes may be passed through the magnetizing coils and fields of 1,000 oersteds may be generated from a 10 ampere, 120 VAC, 60 Hertz line.

The two search coils 12 and 16 are wound with 560 turns of 040 nyclad copper wire in 4 layers 1.5 centimeters long and cemented with varnish on a one-eighth inch (about 0.3 cm) diameter 6 mil (about 0.15 mm) wall stainless steel tubing. The search coils 12 and 16 are spaced 6 centimeters apart, which distance is sufficient to avoid mutual inductance between the search coils 12 and 16.

Figure 4:
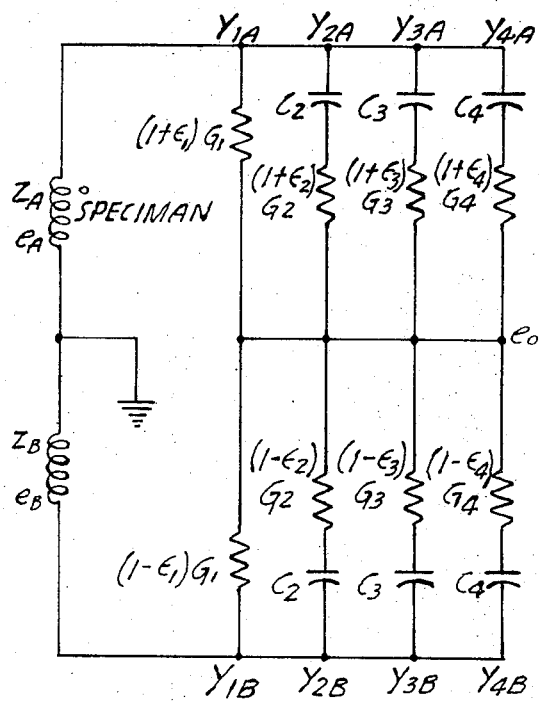
FIG. 4 is a schematic diagram of an equivalent circuit of the bridge circuit of the present invention such as the bridge circuit of FIG. 1 for analyzing the bridge circuit of the present invention.

The bridge circuit of the present invention is analyzed with reference to FIG. 4 wherein $Z_A$ is the impedance of search coil 12 and $Z_B$ is the impedance of search coil 16. The bridge circuit output signal depends on the bridge arm admittances. The admittance of the compensation arm 22 is $Y_{1A}$ which is equal to a conductance $(1+\epsilon_1)G_1$. The admittance of the compensation arm 24 is equal to the conductance $(1-\epsilon_1)G_1$. $\epsilon_1$ is determined by the adjustment of the voltage divider 38 of the pair 22 and 24. The admittance of compensation arms 26, 28, 30, 32, 34 and 36 are represented by $Y_{2A}$, $Y_{2B}$, $Y_{3A}$, $Y_{3B}$, $Y_{4A}$ and $Y_{4B}$ respectively. The admittance $Y_{2A}$ is equal to $(1+\epsilon_2)G_2 + j\omega C_2$. $\epsilon_2$ is determined by the adjustment of the voltage divider 44 of the pair 26 and 28. Accordingly, the input impedance to ground for the bridge circuit is $$Z_{AT} = \frac{1}{Y_{AT}} = \frac{1}{Y_{1A} + Y_{2A} + Y_{3A} + Y_{4A}}.$$

The bridge output impedance is ½$Z_{AT}$.

Figure 5:
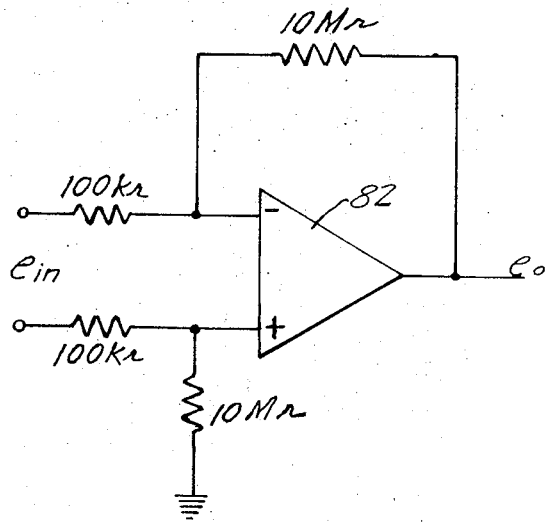
FIG. 5 is a schematic diagram of a preamplifier circuit shown in FIG. 2 as connected with the bridge circuit of FIG. 1.

To provide accuracy, the search coil impedance $Z_A$ must be much less than the bridge circuit input impedance $Z_{AI}$ and the impedance connected at the bridge output must be much larger than the bridge circuit output impedance. Accordingly, a preamplifier 68 such as an operational amplifier circuit having the component values set forth in FIG. 5 is used with the bridge circuit of FIG. 1 to serve as an impedance buffer as well as to preamplify the signal from the sensing terminal 42 prior to leading it to the integrator circuit 72. An operational amplifier 82 such as an Analogue Devices model 140 is used in the preamplifier 68 shown in the circuit of FIG. 5.

Figure 6A:
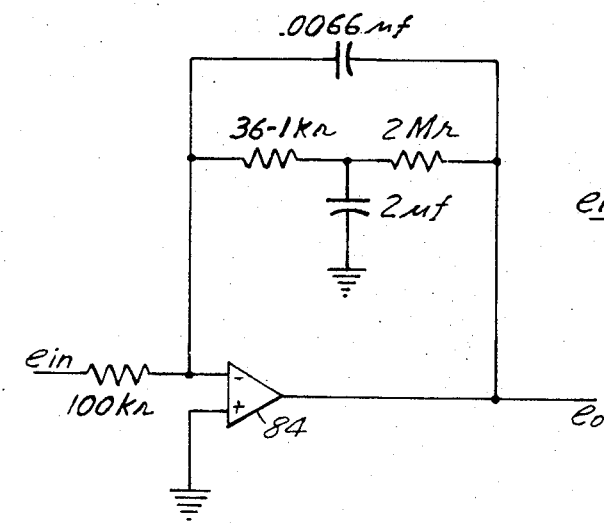
FIG. 6A is a schematic diagram of a bridge -T feedback circuit which is used for integrator circuits shown in FIG. 2.
Figure 6B:
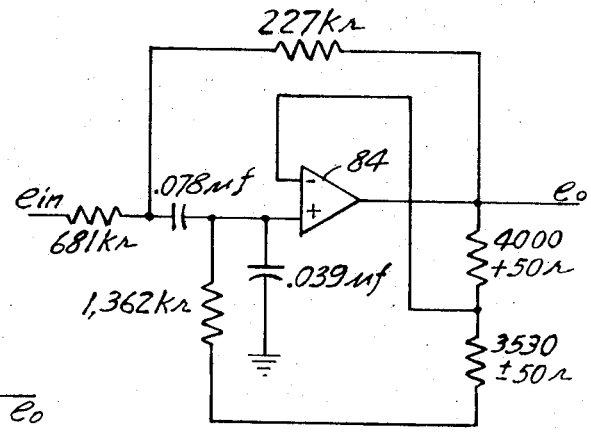
FIG. 6B is a schematic diagram of a band-pass filter circuit which is used for the integrator circuits of FIG. 2 in place of the bridge–T feedback circuit shown in FIG. 6A.

The integrator circuits 72 and 78 are either a bridge – T feedback circuit as illustrated in FIG. 6A or a band-pass filter circuit as shown in FIG. 6B. Because they both provide a high signal to noise ratio, it is advantageous to use either the bridge–T feedback circuit or the band-pass filter circuit as the integrator circuit combined with the highly sensitive bridge circuit of the present invention. An Analogue Devices model 101A operational amplifier 84 is used in both of the integrator circuits 72 and 78 illustrated in FIGS. 6A and 6B. The cathode ray oscilloscope is a Tektronix model 536 with Type L plug in units.

With the bridge circuit of the present invention the M–H curves of such weakly magnetic materials as $GaFeO_3$, $FeCl_2$ $4H_2O$, and $NiFe_2O_4$ have been measured. The present invention possesses a simplicity of design, construction, operation, and analysis and is unencumbered by external compensating signal excitation sources.

The bridge circuit of the present invention may also be advantageously used to improve detection sensitivity in measuring other electrical and optical properties of materials by substituting appropriate electrical property or optical property sensing means for the search coils in the sample and matching arms.

For example, in measuring ferroelectric properties, capacitive elements are substituted for the search coils. The capacitive element in the sample arm contains the specimen material as its dielectric. The capacitive element in the matching arm has a capacitance approximately equal to the linear capacitance of the capacitive element in the sample arm.

I claim:

1. A bridge circuit for measuring an electrical signal representative of a property of a sample material, which signal is produced by exciting a sample of a said material with energy of a predetermined fundamental frequency, including a sample arm having means for receiving a said material sample, a matching arm approximately electrically equivalent to the sample arm connected to the sample arm at a common terminal and in series therewith, and a compensation arm matrix connected across the series-connected sample arm and matching arm and including compensation arms connected to each other at a sensing terminal, wherein prior to the receipt of a said material sample in the sample arm the impedances of the compensation arms are adjusted to produce a null between the sensing terminal and the common terminal thereby enabling a said representative signal to be detected at the sensing terminal upon the receipt of a said material sample in the sample arm, wherein the improvement comprises a compensation arm matrix of parallel-connected pairs of approximately equivalent compensation arms for enabling the bridge circuit for detection of weak representative signals by compensating for those multiple harmonic frequency components of signals present in the bridge circuit incident to the energy which excites a said material sample, said pairs comprising:

a first pair of approximately equivalent compensation arms (22 and 24) for compensating for an in-phase predetermined fundamental frequency component, which first pair includes a resistance dividing device (38) having a divider (40) connected to the sensing terminal (42) for adjusting the resistance in each arm of the first pair;

a second pair of approximately equivalent compensation arms (26 and 28) for compensating for an out-of-phase predetermined fundamental frequency component, which second pair includes an impedance dividing device (44) having a divider (46) connected to the sensing terminal (42) for adjusting the impedance in each arm of the second pair, and which second pair has an impedance-versus-frequency characteristic whereby the greatest phase angle sensitivity to changes in impedance is at a said predetermined fundamental frequency; and at least one additional pair of approximately equivalent compensation arms (30 and 32), each additional pair for compensating for a said multiple harmonic frequency component, each of which additional pairs includes an impedance dividing device (48) having a divider (52) connected to the sensing terminal (42) for adjusting the impedance in each arm of the additional pair, and each of which additional pairs has an impedance-versus-frequency characteristic whereby the greatest sensitivity to changes in impedance is at a said multiple harmonic frequency.

2. A bridge circuit according to claim 1 wherein at the predetermined fundamental frequency the first pair of compensation arms (22 and 24) has a given resistance, which is substantially less than the combined impedance of the other pairs of compensation arms (26 and 28, 30 and 32, and 34 and 36), and the second pair of compensation arms (26 and 28) has a given impedance which is substantially less than the combined impedance of the additional pairs of compensation arms (30 and 32, and 34 and 36).

3. In combination, a bridge circuit according to claim 1; and
means (60) for detecting a representative signal, which detecting means are operatively connected between the sensing terminal (42) and the common terminal (18).

4. In combination, a bridge circuit according to claim 1;
a first integrator circuit (72) having its input operatively coupled to the sensing terminal (42); and
a second integrator circuit having its input operatively coupled to the terminal (58) at which the matching arm (14) is connected to the compensation arm matrix (20).

5. A bridge circuit according to claim 1 for measuring the magnetic properties of a material wherein the sample arm (10) includes a search coil (12) for receiving a said material sample and the impedance elements include resistive elements and capacitive elements.

6. A bridge circuit according to claim 1 wherein the sample arm impedance is much less than the compensation arm matrix input impedance.

7. A bridge circuit according to claim 2 wherein at a said multiple harmonic frequency the additional pair of compensation arms for compensating for components of the multiple harmonic frequency (30 and 32) has a given impedance which is substantially less than the combined impedance of the other additional pairs of compensation arms for compensating for components of higher multiple harmonic frequencies (34 and 36).

8. In combination, a combined circuit according to claim 4; and
a display means (60) having a first deflection means (74) operatively coupled to the first integrator circuit (72), and a second deflection means (80) operatively coupled to the second integrator circuit (78) for providing a display in response to signals received from the first and second integrator circuits.

9. A combined circuit according to claim 4 wherein the first integrator circuit (72) is coupled to the sensing terminal (42) through a circuit (68) which has a much larger input impedance than the output impedance of the compensation arm matrix (20).

10. A combined circuit according to claim 4 wherein at least one of the integrator circuits is a bridge–T feedback circuit.

11. A combined circuit according to claim 4 wherein at least one of the integrator circuits is a band-pass filter circuit.

UNITED STATES PATENT OFFICE
CERTIFICATE OF CORRECTION

Patent No. 3,562,636    Dated February 9, 1971

Inventor(s)    John C. Huber

It is certified that error appears in the above-identified patent and that said Letters Patent are hereby corrected as shown below:

Col. 4, line 3, change "HHertz" to -- Hertz --.

Col. 5, line 70, change "O40" to -- #40 --.

Col. 6, line 19, change "imped ce" to -- impedance --; and line 21, change "$Z_{AI}$" to -- $Z_{AT}$ --.

Signed and sealed this 10th day of August 1971.

(SEAL)
Attest:

EDWARD M. FLETCHER, JR.
Attesting Officer

WILLIAM E. SCHUYLER, JR.
Commissioner of Patents